United States Patent
Doerr et al.

(10) Patent No.: US 7,433,549 B2
(45) Date of Patent: Oct. 7, 2008

(54) OPTICAL MODULATOR

(75) Inventors: Christopher Doerr, Middletown, NJ (US); Peter Winzer, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/772,204

(22) Filed: Jun. 30, 2007

(65) Prior Publication Data

US 2008/0069492 A1    Mar. 20, 2008

Related U.S. Application Data

(60) Provisional application No. 60/845,973, filed on Sep. 20, 2006.

(51) Int. Cl.
*G02F 1/01* (2006.01)
(52) U.S. Cl. ............................ 385/1; 385/4
(58) Field of Classification Search .............. None
See application file for complete search history.

(56) References Cited

U.S. PATENT DOCUMENTS

| | | | | |
|---|---|---|---|---|
| 5,572,611 | A * | 11/1996 | Jinguji et al. | 385/17 |
| 5,995,685 | A * | 11/1999 | Seino | 385/3 |
| 6,643,040 | B2 * | 11/2003 | Shen et al. | 359/107 |
| 6,892,021 | B2 * | 5/2005 | Doerr | 385/140 |
| 6,947,633 | B2 * | 9/2005 | Singh et al. | 385/27 |
| 7,366,425 | B2 * | 4/2008 | Mamyshev et al. | 398/188 |
| 2002/0136479 | A1 * | 9/2002 | Verghese et al. | 385/2 |
| 2004/0081393 | A1 * | 4/2004 | Singh et al. | 385/27 |
| 2004/0136647 | A1 * | 7/2004 | Mizuno et al. | 385/24 |
| 2004/0184723 | A1 * | 9/2004 | Chandrasekhar et al. | 385/27 |
| 2004/0208414 | A1 * | 10/2004 | Lee et al. | 385/14 |
| 2004/0228564 | A1 * | 11/2004 | Gunn et al. | 385/1 |
| 2005/0053377 | A1 * | 3/2005 | Yoo | 398/79 |
| 2006/0280509 | A1 * | 12/2006 | Tomaru et al. | 398/188 |
| 2007/0058988 | A1 * | 3/2007 | Yonenaga | 398/186 |
| 2007/0177882 | A1 * | 8/2007 | Akiyama | 398/185 |
| 2007/0189662 | A1 * | 8/2007 | Nakamura | 385/16 |

* cited by examiner

*Primary Examiner*—Sung Pak
*Assistant Examiner*—Chad H Smith

(57) ABSTRACT

A high-speed optical modulator constructed from a number of lower speed intensity modulators integrated onto a single optical chip.

9 Claims, 2 Drawing Sheets

OPTICAL MODULATOR

CROSS-REFERENCE TO RELATED APPLICATIONS

This application claims the benefit of U.S. Provisional Patent Application No. 60/845,973 filed on Sep. 20, 2006 the entire file wrapper contents of which are incorporated by reference as if set forth at length herein.

FIELD OF THE INVENTION

This invention relates generally to the field of optical communications and in particular to a high-speed optical modulator

BACKGROUND OF THE INVENTION

In attempts to realize high-speed broadband optical communications, high expectations are placed on optical modulators.

SUMMARY OF THE INVENTION

An advance is made in the art according to the principles of the present invention whereby a high-speed optical modulator is constructed from a number of lower-speed intensity modulators.

According to an aspect of the invention, the modulator is constructed from an integrated planar lightwave circuit including a pulse carver, an interferometer and a number of intensity modulators and phase shifters positioned within arms of the interferometer.

According to another aspect of the invention, the pulse carver receives an incoming continuous wavelength optical signal and creates optical pulses at a data rate of P/N where P is a desired high-speed data rate and N is an integer number. Light output from the pulse carver is directed into the arms of the interferometer. A non-return-to-zero output optical signal is generated when the phase shifters in each of the arms are adjusted such that signals from all of arms add in phase.

BRIEF DESCRIPTION OF THE DRAWING

A more complete understanding of the present invention may be realized by reference to the accompanying drawing in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
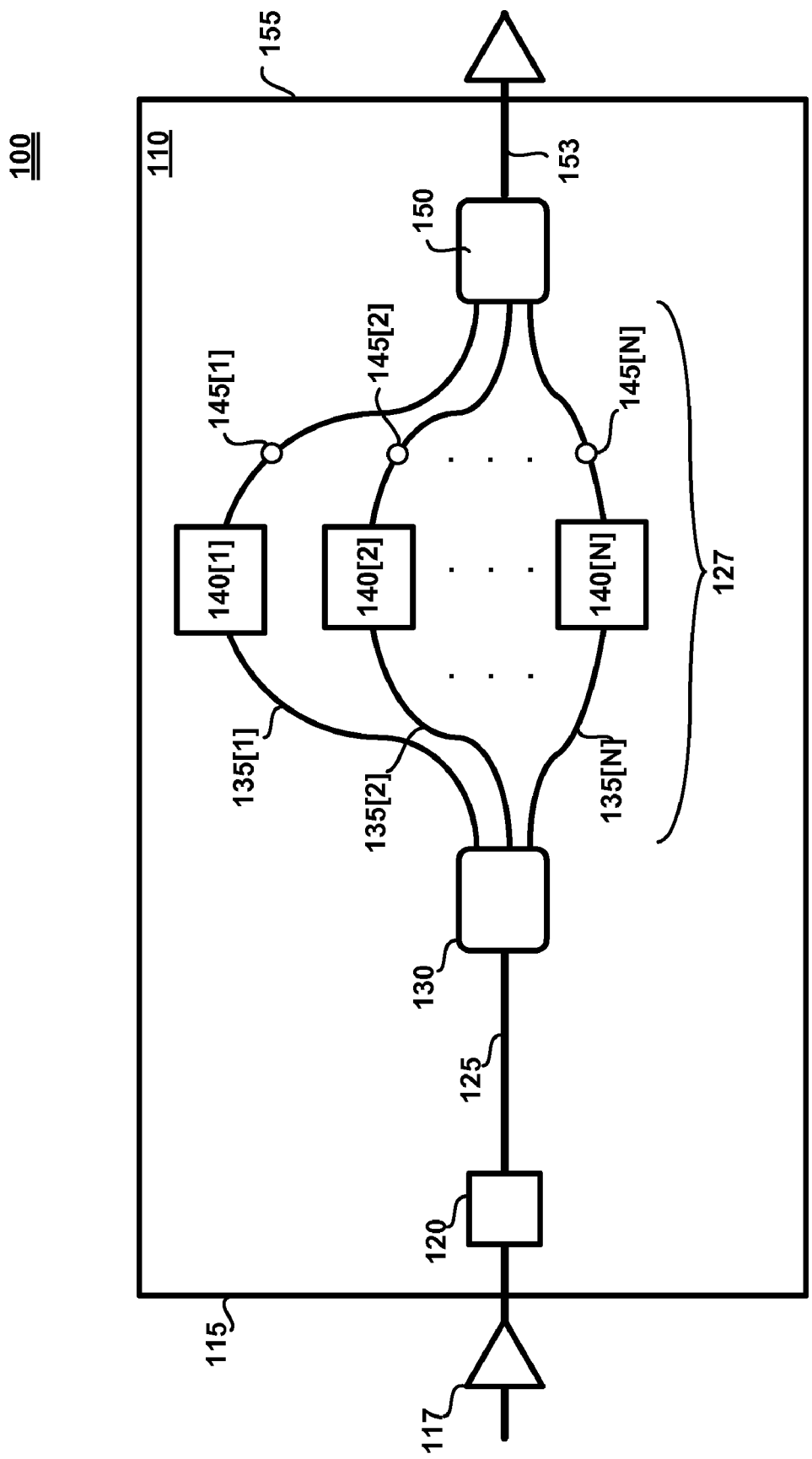
FIG. 1 is a schematic of a high-speed optical modulator according to the present invention.

With initial reference to FIG. 1, there it shows an exemplary configuration of a high-speed modulator 100 constructed according to the teachings of the present invention. More particularly, the high-speed modulator 100 is shown integrated onto a single semiconductor chip 110 comprising a pulse carver 120 and an interferometer structure 127 having an input coupler 130, and an output coupler 150 interconnected by a number of unequal length waveguides 135[1] . . . 135[N] wherein each of the waveguides includes an intensity modulator 140[1] . . . 140[N] and a phase shifter 145[1] . . . 145[N]. Advantageously, the intensity modulators 140[1] . . . 140[N] may be electroabsorption modulators (EAM) and the overall interferometer structure may be constructed using familiar materials and processes for example, $LiNbO_3$.

Operationally, an external, continuous wavelength (CW) light source 117 (for example a laser) is used to generate CW light which is directed into the modulator chip 110 where it is received by the pulse carver 120 which itself may comprise an EAM. As those skilled in the art will readily appreciate, the CW light source 117 need not be external to the modulator chip 110 but can be conveniently integrated onto the chip 110 along with the other components. Where however, the CW light source 117 is not integrated onto the chip 110, the edge of the chip through which the CW light is received is preferably provided with an anti-reflective coating 115 to promote the coupling of the CW light generated into the chip 110.

When the CW light is received by the pulse carver 120 a series of optical pulses is produced and directed to an input coupler 130 of the interferometer structure 127 via waveguide 125. As noted earlier, the pulse carver 120 may be advantageously constructed from an EAM which those skilled in the art will readily appreciate can be made quite easily, be quite short, and exhibit a very high bandwidth. Electroabsorption modulators may advantageously be operated at very high speeds and may even be integrated with the laser CW light source previously described.

Optical pulses output by the pulse carver 120 are directed into the interferometer 127 which—as noted before—includes an input coupler 130, an output coupler 150 optically connected by a number of unequal length waveguides 135[1] . . . 135[N], each of which includes an intensity modulator 140[1] . . . 140[N] and a phase shifter 145[1] . . . 145[N]. The phase shifters are adjusted such that signals traversing each of the arms 135[1] . . . 135[N] add in phase when recombined through the effect of output coupler 150 and subsequently output via waveguide 153 from edge of chip 110 which—similarly to the input—is coated with an antireflective coating 155.

As noted before, each of the arms 135[1] . . . 135[N] of interferometer 127 has an unequal path length. The path length difference between the arms is determined by the desired output data rate of the modulator 100 which is substantially the distance (in time) equal to 1/P where P is the desired high-speed data rate and the pulse carver 120 produces pulses from the incoming CW light at a rate of P/N. The individual intensity modulators 140[1] . . . 140[N] operate at a data rate of P/N. To generate a non-return-to-zero (NRZ) output signal the phase shifters 145[1] . . . 145[N] are adjusted such that signals from all of the arms 135[1] . . . 135[N] add in-phase.

At this point, those skilled in the art should appreciate that the structures shown in FIG. 1 which exhibit the principles of the invention may be extended to the multiplexing of any number of individual data streams. For example, the number of individual waveguide arms 135[1] . . . 135[N] may of course be increased along with the corresponding number of amplitude modulators 140[1] . . . 140[N] and phase shifters 145[1] . . . 145[N].

Figure 2:
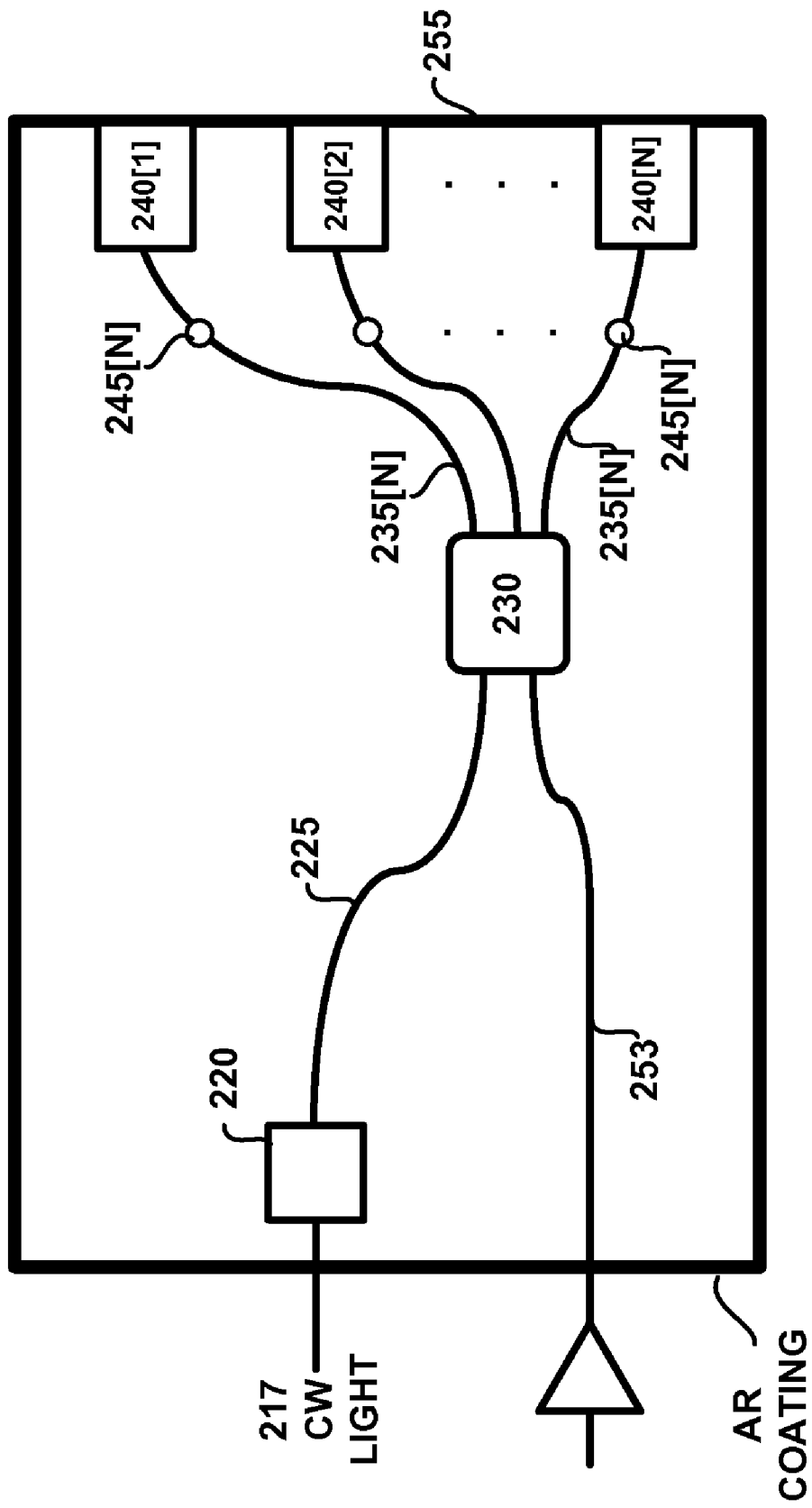
FIG. 2 is a schematic of an alternative embodiment of an optical modulator according to the present invention.

Turning now to FIG. 2, there is shown an alternative embodiment of a high-speed modulator 200 constructed according to the principles of the invention. As shown in this FIG. 2, the device employs a reflective geometry which advantageously permits the overall length of the integrated chip 210 to be substantially shorter than the device shown previously in FIG. 1. More particularly, this reflective configuration permits individual unequal length waveguide arms 235[1] . . . 235[N] comprising an interferometer structure to be substantially shortened from the prior configuration.

As shown in this FIG. 2, CW light 217 enters the integrated chip 210 and is received by pulse carver 220. As with the previous embodiment, the edge of the integrated chip is preferably coated with an antireflective coating 215 and the pulse carver 220 may be conveniently fabricated from an EAM.

Pulses of light generated by the pulse carver 220 are directed into a reflective interferometer structure comprising an input/output coupler 230 and a number of unequal length waveguides 235[1] . . . 235[N] each having a phase shifter 245[1] . . . 245[N] and an intensity modulator 240[1] . . . 240[N].

As shown in FIG. 2, an edge of the chip 210 is coated with a highly reflective coating 255 such that light entering the input/output coupler 230 and traversing waveguide arms 235 [1] . . . 235[N] is reflected by the highly reflective coating 255 such that it substantially reverses direction and is subsequently directed back through the waveguide arms and coupler 230 into output waveguide 253 where it exits the modulator 200.

Those skilled in the art will recognize that the path length difference for this reflective configuration requires a path length (time) difference of ½P where the intensity modulators 240[1] . . . 240[N] are running at P/N bits/sec. Since in a representative embodiment the intensity modulators 240[1] . . . 240[N] are preferably constructed from EAM devices, those devices need only be ½ the length of those similar devices shown previously. Accordingly, the overall length of the device is shortened considerably.

Operationally, if a signal exhibiting P bits/sec is desired, and a number N of waveguide arms are employed, then CW light is directed into the chip 210 or alternatively generated by an on-chip laser (not shown). The EAM pulse carver 220 converts the CW light into pulses at P/N GHz, where the duty cycle of the device is preferably 1/N. Advantageously, the coupler may be a directional coupler if N=2. For N greater than 2, well-known star couplers may advantageously used. Alternatively, a tree of couplers may be used, depending upon the specific configuration employed. Whatever coupler configuration employed, the path length difference for adjacent waveguide arms will be 1/P (½P for reflective arrangement). Each of the arm paths includes a preferably static phase shifter which are used to control the relative phases of optical signals in the paths. If the phase controlled signals are in phase when re-combined, then the resulting output signal is a NRZ signal. If they combine with 180 phase difference and N=2, then a CSRZ signal is produced.

At this point, while we have discussed and described our invention using some specific examples, those skilled in the art will recognize that our teachings are not so limited. Accordingly, our invention should be only limited by the scope of the claims attached hereto.

The invention claimed is:

1. An optical modulator for generating an optical signal of P bits/second comprising:
    a pulse carver for generating a series of optical pulses from a continuous wavelength optical signal; and
    an interferometer for producing a series of higher frequency optical pulses from the series of optical pulses, said interferometer including:
    an input coupler;
    an output coupler; and
    a number N of optical waveguide arms connecting the input coupler to the output coupler wherein each one of the waveguide arms exhibits a path length difference of 1/P from an adjacent waveguide arm and each of said N arms has an intensity modulator operating at P/N bits/second and a phase shifter for adjusting the phase of optical signals traversing the arm;
    wherein said phase shifters are adjusted such that the relative phases of optical signals traversing the arms add in phase through the effect of the output coupler.

2. The optical modulator of claim 1 wherein said phase shifters are adjusted such that the relative phases of optical signals traversing the arms add out of phase with respect to successively longer arms thereby generating a carrier-suppressed return-to-zero (CSRZ) signal.

3. The optical modulator of claim 1 wherein said interferometer is a reflective configuration and each one of the waveguide arms exhibits a path length difference of ½P.

4. The optical modulator of claim 2 wherein said interferometer is a reflective configuration and each one of the waveguide arms exhibits a path length difference of ½P.

5. The optical modulator of claim 1 wherein a single coupler acts as both input coupler and output coupler and an edge of a chip onto which the modulator is integrated includes a highly-reflective coating at an edge having the number of intensity modulators.

6. The optical modulator of claim 1 wherein said pulse carver comprises an electroabsorption modulator.

7. The optical modulator of claim 1 wherein said number of intensity modulators comprises an electroabsorption modulator.

8. The optical modulator of claim 1 further comprising a continuous wavelength laser.

9. The optical modulator of claim 2 further comprising a continuous wavelength laser.

* * * * *